（12）United States Patent
Kim et al.

(10) Patent No.: US 8,195,176 B2
(45) Date of Patent: Jun. 5, 2012

(54) METHOD FOR INFORMING USER EQUIPMENT OF DOWNLINK CONTROL MESSAGE CONSTRUCTION INFORMATION IN CELLULAR SYSTEM

(75) Inventors: Su Nam Kim, Anyang-si (KR); Jin Soo Choi, Anyang-si (KR); Bin Chul Ihm, Anyang-si (KR); Jeong Ki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 12/588,767

(22) Filed: Oct. 27, 2009

(65) Prior Publication Data

US 2010/0113047 A1 May 6, 2010

Related U.S. Application Data

(60) Provisional application No. 61/108,559, filed on Oct. 27, 2008, provisional application No. 61/139,619, filed on Dec. 21, 2008, provisional application No. 61/139,635, filed on Dec. 22, 2008, provisional application No. 61/149,024, filed on Feb. 2, 2009, provisional application No. 61/149,708, filed on Feb. 4, 2009, provisional application No. 61/157,555, filed on Mar. 5, 2009, provisional application No. 61/168,223, filed on Apr. 10, 2009, provisional application No. 61/181,672, filed on May 28, 2009, provisional application No. 61/220,584, filed on Jun. 26, 2009.

(30) Foreign Application Priority Data

Jul. 24, 2009 (KR) ........................ 10-2009-0067916

(51) Int. Cl.
*H04W 72/04* (2009.01)
(52) U.S. Cl. ........................................ 455/450; 370/329
(58) Field of Classification Search .................. 455/419; 370/329
See application file for complete search history.

(56) References Cited

U.S. PATENT DOCUMENTS

| 2004/0013102 | A1 | 1/2004 | Fong et al. |
| 2005/0159163 | A1 | 7/2005 | Chang et al. |
| 2007/0058523 | A1 | 3/2007 | Cho et al. |
| 2010/0111015 | A1* | 5/2010 | Kim et al. ............ 370/329 |
| 2010/0113047 | A1* | 5/2010 | Kim et al. ............ 455/450 |
| 2011/0044297 | A1 | 2/2011 | Lee et al. |
| 2012/0039289 | A1 | 2/2012 | Kim et al. |

FOREIGN PATENT DOCUMENTS

| KR | 10-2005-0049299 | 5/2005 |
| KR | 10-2005-0114165 | 12/2005 |
| KR | 10-0557150 | 3/2006 |
| KR | 10-2007-0117812 | 12/2007 |

* cited by examiner

*Primary Examiner* — William D Cumming
(74) *Attorney, Agent, or Firm* — McKenna Long & Aldridge LLP

(57) ABSTRACT

A base station according to the present invention groups a plurality of control messages for a user equipment into one or more control message groups based on at least one criteria. The plurality of control messages is transmitted with control message construction information from the base station to the user equipment. The control message construction information includes information about a number of control messages included in each control message group generated by the grouping. The user equipment receives and decodes the plurality of control messages based on the control message construction information.

5 Claims, 12 Drawing Sheets

QPSK 1/2     QPSK 1/4

FFR 1/3 POWER BOOSTING PARTITION

QPSK 1/2 with respect to all portions of the frame, in which
METHOD FOR INFORMING USER EQUIPMENT OF DOWNLINK CONTROL MESSAGE CONSTRUCTION INFORMATION IN CELLULAR SYSTEM This application claims the benefit of Korean Patent Application No. 10-2009-0067916, filed on Jul. 24, 2009, which is hereby incorporated by reference as if fully set forth herein.

This application also claims the benefit of U.S. Provisional Application Ser. Nos. 61/108,559, filed on Oct. 27, 2008, 61/139,619, filed on Dec. 21, 2008, 61/139,635, filed on Dec. 22, 2008, 61/149,024, filed on Feb. 2, 2009, 61/149,708, filed on Feb. 4, 2009, 61/157,555, filed on Mar. 5, 2009, 61/168, 223, filed on Apr. 10, 2009, 61/181,672 filed on May 28, 2009 and 61/220,584, filed on Jun. 26, 2009 the contents of which are hereby incorporated by reference herein in their entirety.

BACKGROUND OF THE INVENTION

1. Field of the Invention

The present invention relates to a method for reducing complexity in detection of control messages received by a user equipment, when the control messages are transmitted to a user equipment or a user equipment group in a cellular system.

2. Discussion of the Related Art

In a cellular system, in order to allow user equipments (UEs) to receive data from a base station, the UEs should first transmit a variety of information messages (hereinafter, control messages) such as resource locations, in which their data is present, modulation and coding schemes and Multiple-Input Multiple-Output (MIMO) schemes. Such control messages should be present in each of the UEs which will receive the data from the base station. Similarly, a method for grouping a plurality of UEs into groups and transmitting control messages according to the groups may be considered. At this time, the size of each of the control messages may be changed according to the contents of information and the modulation and coding schemes.

Meanwhile, when a base station transmits control messages having different sizes to UEs, a method for reporting the location information of the control messages in a frame and modulation and coding information in advance and a method which does not report the above information may be considered, respectively.

In the former case, since the UEs know the location of the control messages in the frame and the modulation and coding information, the control messages can be easily detected. However, it is disadvantageous that additional information should be further transmitted.

In contrast, in the latter case, since additional information is not transmitted, overhead does not occur, but each of the UEs should perform blind detection in order to confirm its control messages. That is, all the UEs should perform blind detection with respect to all portions of the frame, in which the control messages are present. Meanwhile, if the number of cases which should be considered when the blind detection is performed is increased, the complexity and time for confirming the control messages are increased and thus the power of each of the UEs may be lost. Accordingly, a method for easily performing blind detection while minimizing overhead should be considered.

The complexity of the blind detection is changed depending on how large control messages are constructed or how many control messages are considered. If all the sizes of the control messages are different from one another, the complexity may be increased. Accordingly, the number of sizes of the control messages is generally limited to a predetermined value. For example, if a total of three sizes including 30 bits, 60 bits and 90 bits are allowed as the sizes of the control messages, the complexity may be decreased. If the basic unit of the size is defined as a Control Block (CB) for convenience, control messages having three sizes of 1CB, 2CB and 3CB may be present (if it is assumed that 1CB=30 bits).

However, even when the sizes of the control messages are set in the CB units, the complexity of blind detection is significantly high. For example, if three types of CBs are present and a total of four control messages are considered, in blind detection, three cases (1CB, 2CB and 3CB) are present when the number of control messages is 1, $3^2$ cases are present when the number of control messages is 2, $3^3$ cases are present when the number of control messages is 3, and $3^4$ cases are present when the number of control messages is 4.

If a total of 120 cases are present and a UE does not have information about the cases, the UE should perform detection a maximum of 120 times in order to confirm whether the control messages of the UE are present and which information is included if the control messages are present. In general, if the number of types of CBs is N and the maximum number of control messages is M, a maximum number of times of performing detection is sum($N^m$). Since the number of times of performing detection deteriorates system performance, a method for reducing the number of times of performing detection should be considered.

Meanwhile, frequency reuse is one method for increasing the number of channels per unit area in a cellular system. As a distance is increased, the intensity of a wave gradually weakens. Thus, interference between waves is low at places separated from each other by a predetermined distance or more, and thus the same frequency channel may be used. Using such a principle, the same frequency may be simultaneously used in various places such that subscriber capacity is significantly increased. The effective use of the frequency is called frequency reuse. A unit for distinguishing between places is called a cell (mobile communication cell) and frequency channel switch between cells for holding a call is called handoff. In an analog cellular mobile communication scheme, frequency reuse technology is necessary. A frequency reuse rate is one parameter indicating frequency efficiency in a cellular system. The frequency reuse rate is obtained by dividing a total number of cells (sectors) simultaneously using the same frequency in a multi-cell structure by a total number of cells (sectors) of the overall multi-cell structure.

The frequency reuse rate of a 1G system (e.g., an Advanced Mobile Phone System (AMPS)) is less than 1. For example, in 7-cell frequency reuse, a frequency reuse rate is ⅐. The frequency reuse rate of a 2G system (e.g., a Code Division Multiple Access (CDMA) or Time Division Multiple Access (TDMA) system) is better than that of the 1G system. For example, the frequency reuse rate of a Global System for Mobile communication (GSM) which is a combination of a Frequency Division Multiplexing Access (FDMA) system and a TDMA may reach ¼ to ⅓. The frequency reuse rate of a 2G CDMA system and a 3G WCDMA system may reach 1 such that spectral efficiency is increased and network arrangement costs are decreased.

When all the sectors of one cell and all the cells of one network use the same frequency, a frequency reuse rate of 1 can be obtained. However, when the frequency reuse rate of 1 is obtained in a cellular network, signal reception performance of UEs located on the boundary between cells is decreased by interference from a neighbor cell.

In an Orthogonal Frequency Division Multiple Access (OFDMA) system, since channels are separated in the sub-channel units, a signal is transmitted via a subchannel and all channels are not used as in the 3G system (CDMA2000 or WCDMA). Using such features, the throughput of the UEs located at the central area of a cell and the UEs located on the boundary between cells can be simultaneously improved. In detail, the central area of a cell is close to a base station and thus is safe from co-channel interference from a neighbor cell. Accordingly, the UEs located on the central area of a cell may use all available subchannels. However, the UEs located on the boundary between cells may use only some of all available subchannels. In the boundary between neighbor cells, a frequency is allocated such that the cells use different subchannels. Such a scheme is called Fractional Frequency Reuse (FFR).

If FFR is applied to a cellular system and the number of cases considered when blind detection is performed is increased, the complexity and time for confirming control messages are increased and thus the power of a UE is lost. Accordingly, there is a need for a method for easily performing blind detection while minimizing overhead.

SUMMARY OF THE INVENTION

Accordingly, the present invention is directed to a method for transmitting downlink control messages in a cellular system that substantially obviates one or more problems due to limitations and disadvantages of the related art.

An object of the present invention is to provide a method for easily performing blind detection of control messages transmitted from a base station to a User Equipment (UE) while minimizing overhead.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for, at a base station, informing a user equipment of control message construction information in a cellular system includes at the base station, generating the control message construction information indicating a construction scheme of a plurality of control messages for at least one user equipment; and transmitting the generated control message construction information to the at least one user equipment, wherein the plurality of control messages for the at least one user equipment are grouped based on at least one criteria of whether or not uplink Acknowledgment/Negative Acknowledgement (ACK/NACK) channel indexes are allowed to be implicitly used, whether or not the user equipment corresponding to the control messages is able to implicitly use the uplink ACK/NACK channel indexes, sizes of Information Elements (IEs) of the control messages, whether or not the control messages are segmented into a predetermined number of subblocks, Modulation and Coding Scheme (MCS) levels applied to the control messages, sizes of allocated IEs of the control messages after applying the MCS levels, and frequency partitions in which the IEs of the control messages are present, and, if groups generated by the grouping are aligned and transmitted, alignment information of the control messages includes information about the number of control messages included in each of the groups generated by the grouping or the size of each of the groups.

The information about the number of control messages included in each of the groups may be index information selected from a predetermined table.

Each of the groups may include resource units which are logically contiguous or physically contiguous.

Information about the number of control messages included in each of the groups or the size of each of the groups may be transmitted via a non-user-specific control message.

In each of the groups, the control messages included in each of the groups may be transmitted in a state of being aligned based on the at least one criteria.

According to the present invention, it is possible to easily perform blind detection while minimizing overhead, by aligning and transmitting control messages in a predetermined rule and informing a user of information about a control message alignment pattern in advance before transmitting control messages. Accordingly, it is possible to reduce complexity and time for confirming the control messages.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In the description of the drawings, procedures or steps which render the scope of the present invention unnecessarily ambiguous are not described and procedures or steps which can be understood by those skilled in the art are not described.

The specific terms used in the following description are provided for facilitating the understanding of the present invention and the use of such specific terms may be modified without departing from the technical scope of the present invention.

A whole band used by a base station is divided into a predetermined number of subbands. The whole band may be divided by a base station in advance if Fractional Frequency Reuse (FFR) is used or may be divided for convenience of transmission of control messages. Accordingly, the number of subbands generated by dividing the whole band may be one or more and the sizes of the subbands may be set to be equal or different. If a resource area for allowing a User Equipment (UE) to receive data is allocated in the subbands, the control messages of the UE are present in the subbands.

The complexity of blind detection is changed depending on how large control messages are constructed or how many control messages are considered. If all the sizes of the control messages are different, the complexity may be increased. Accordingly, the number of sizes of the control messages is generally limited to a predetermined value. For example, if a total of three sizes including 30 bits, 60 bits and 90 bits are allowed as the sizes of the control messages, complexity may be significantly decreased. If the basic unit of the size is defined as a Control Block (CB) for convenience, control messages having three sizes of 1CB, 2CB and 3CB may be present.

Meanwhile, after control messages allocated to the resource area are collected, a base station may align the control messages in descending order of the size thereof and sequentially transmit the control messages. For example, if four control messages respectively have sizes of 2CB, 1CB, 3CB and 3CB, the control messages are aligned in order of 3CB, 3CB, 2CB and 1CB so as to be transmitted.

Figure 1:
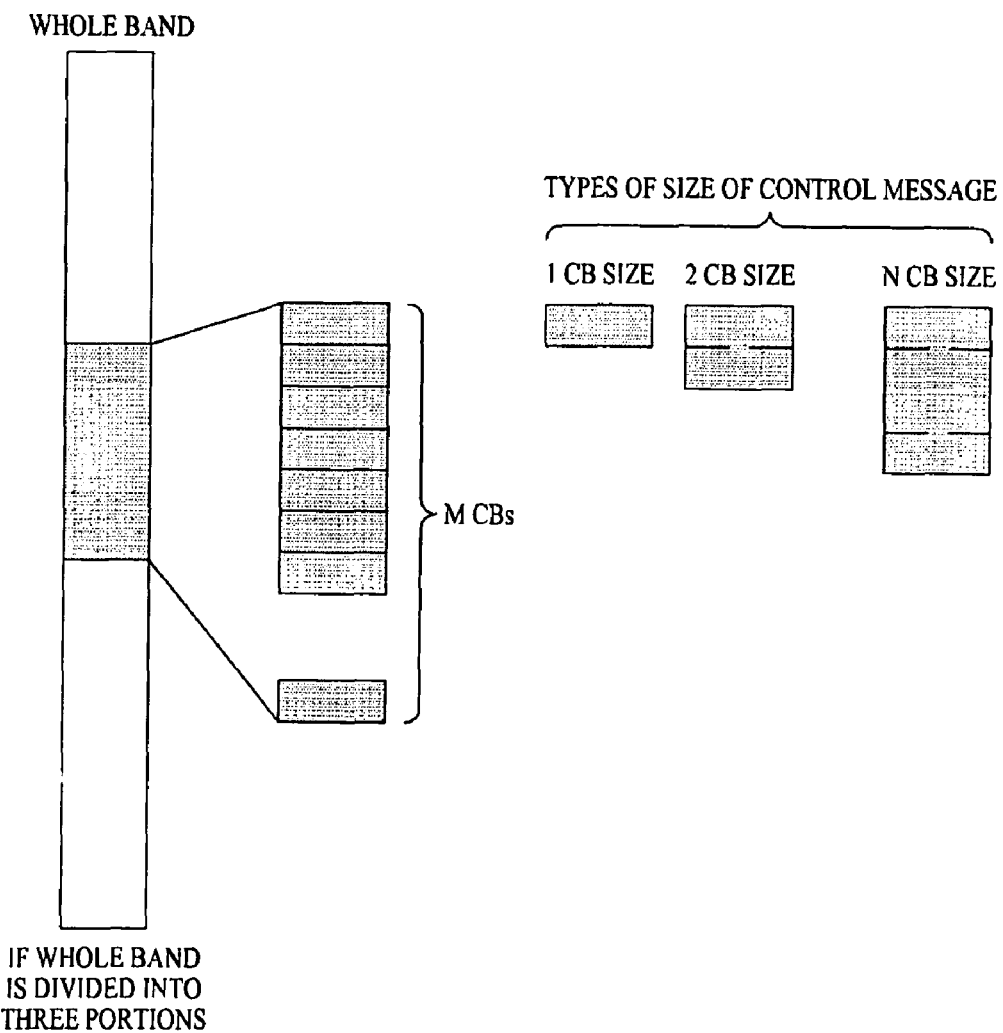
FIG. 1 is a construction diagram of a transmission resource for transmitting control messages.

FIG. 1 is a construction diagram of a transmission resource for transmitting control messages. As shown in FIG. 1, for convenience, it is assumed that the sizes of the control messages are integral multiples (e.g., 1CB, 2CB, 3CB and the like) of a Control Block (CB) and the size of a largest control message is NCB. It is assumed that a resource having a total size of MCB within a divided band may be allocated for transmission of control messages.

Accordingly, if the sizes of all messages are 1CB, a maximum of M control messages may be transmitted in the divided band. For transmission of control messages, if control messages having sizes of 1 to NCB are combined and transmitted in a band to which a resource having a size of MCB is allocated, various combinations are present. In contrast, if control messages are aligned in descending order and are transmitted from a base station, the number of cases is limited and the pattern thereof is also limited.

The cases where the size of a largest control message in the divided band is 1CB to NCB may be considered. If it is assumed that the size of a largest control message is n ($1 \leq n \leq N$) CB, control messages having sizes of 1 to nCB are actually present and may be aligned in descending order so as to be transmitted. In the present invention, when information about a pattern in which the control messages are aligned is control message construction information, a base station transmits the control message construction information in advance before the control messages are transmitted.

Hereinafter, a method for constructing control message construction information according to a first embodiment of the present invention will be described.

Figure 2:
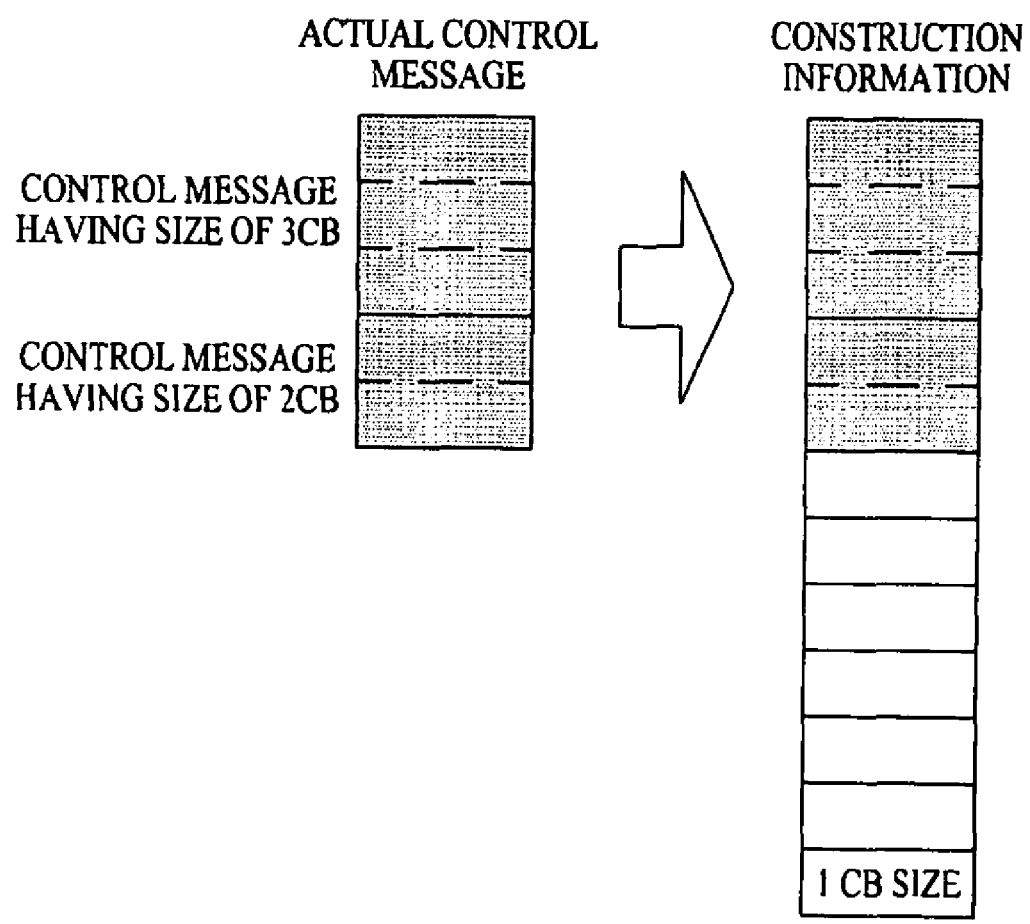
FIG. 2 is a view showing an example of generating control message construction information.

At this time, it is assumed that control message information is present in all divided bands having a size of MCB in order to construct control message construction information. That is, it is assumed that, if the sizes of all the control messages are less than MCB, control messages each having a size of 1CB are present in the remaining portion. FIG. 2 is a view showing an example of generating control message construction information. For example, if M=12, n=3, and both the number of control messages having a size of 3CB and the number of control messages having a size of 2CB are one, the example of generating construction information is shown in FIG. 2.

Table 1 shows a combination of CB sizes constructing control message construction information when the size of a largest control message is n.

TABLE 1

Combinations of the control messages when the size of a largest control message is nCB (n)
(n, 1)
(n, 2), (n, 2, 1)
(n, 3), (n, 3, 1), (n, 3, 2), (n, 3, 2, 1)
(n, 4), (n, 4, 1), (n, 4, 2), (n, 4, 2, 1), (n, 4, 3),
(n, 4, 3, 1), (n, 4, 3, 2), (n, 4, 3, 2, 1)
...
(n, n-1), (n, n-1, 1), ... (n, n-1, n-2, ... 1)

Figure 3:
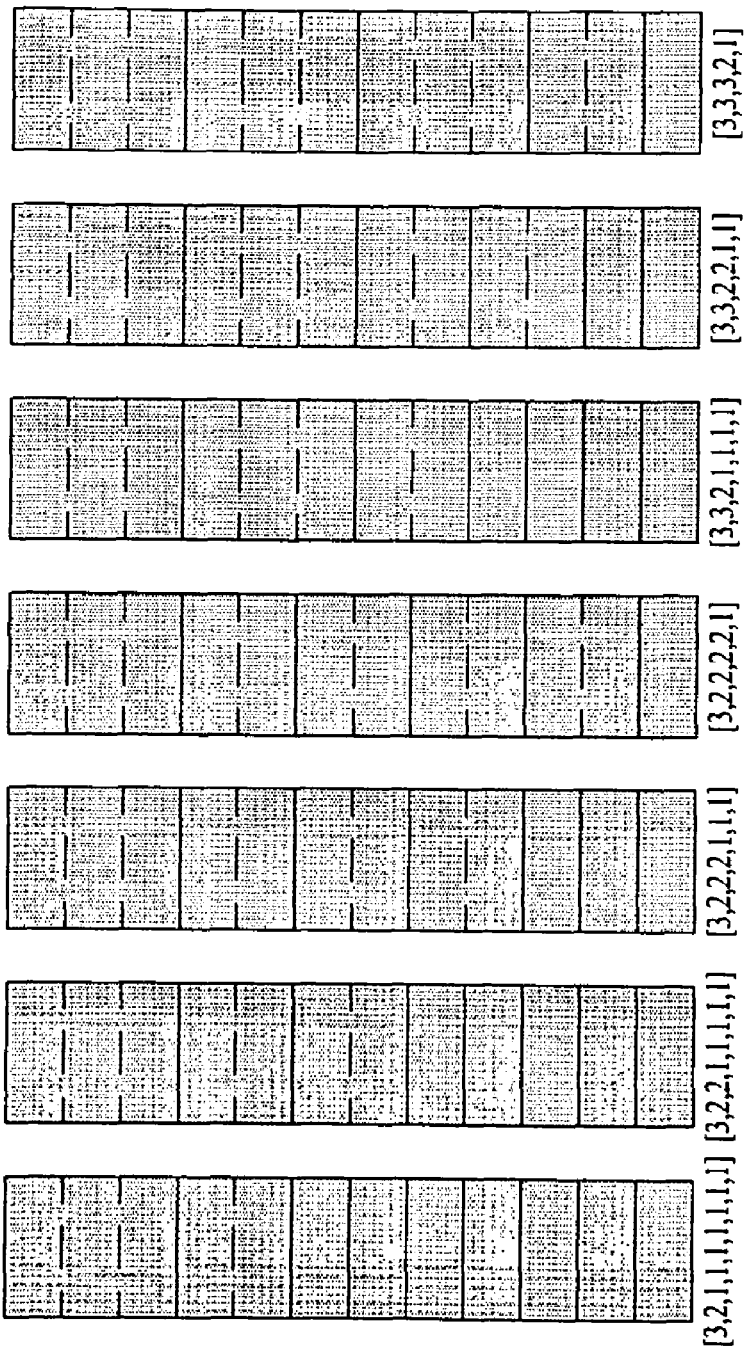
FIG. 3 is a view showing examples of patterns of control message construction information according to the present invention.

The number of types of construction information matched to the combinations shown in Table 1 is changed according to a value M. FIG. 3 is a view showing examples of patterns of control message construction information according to the present invention. For convenience, if it is assumed that M=12 and n=3, patterns shown in FIG. 3 are present as combinations of (3, 2, 1) (this refers to control message construction information composed of control messages having sizes of 1CB, 2CB and 3CB).

The construction information shown in FIG. 3 is configured by combinations of (3, 2, 1), but the respective numbers of 1CB, 2CB and 3CB depend on the value M. For convenience of description, in the above combination, a CB having a size next larger than that of a CB having a smallest size is defined as a CB of next lower order and a CB having a size next larger than that of the CB of next lower order is defined as a CB of a next next lower order. If a CB having a size larger than that of the CB of the next next lower order is present, the CB is defined according to the above-described rule.

For example, if a combination of [3, 2, 1, 1, 1, 1, 1, 1, 1] is considered, the numerals refer to the sizes of the CBs, a CB having a smallest size is 1CB, a CB of next lower order is 2CB, which is next larger than 1CB, and a CB of next next lower order is 3CB, which is next larger than 2CB.

In a method for generating construction information by the same CB combination, the number of CBs other than the CB having the smallest size is set to 1, the CB having the smallest size is filled in the remaining area (e.g., [3, 2, 1, 1, 1, 1, 1, 1, 1]), and the number of CBs of next lower order (e.g., the number of 2CBs) is increased (e.g., [3, 2, 2, 1, 1, 1, 1, 1], [3, 2, 2, 2, 1, 1, 1], [3, 2, 2, 1]).

Such a process is continuously repeated after the number of CBs of next next lower order (e.g., the number of 3CBs) is gradually increased one by one.

That is, [3, 3, 2, 1, 1, 1, 1] is obtained if the number of CBs of next next lower order (e.g., 3CB) is 2, [3, 3, 2, 2, 1, 1] is obtained if the number of CBs of next lower order (2CB) is gradually increased, and [3, 3, 3, 2, 1] is obtained if the number of CBs of next next lower order is 3. If such a process is performed, a specific CB combination may not be obtained according to the value M.

If it is assumed that the value M is 16, a CB combination (3) may not be obtained. If the number of 3CBs is 5, 1CB is necessarily filled in the remaining one, and thus the CB combination (3) cannot be obtained. Instead, the CB combination (3, 1) may be obtained. Accordingly, if the size of a largest control message among the above-described control messages is n, some of the CB combinations constructing the construction information may be excluded according to the value M.

Various patterns constructed by the above-described method according to the values N and M are used as construction information.

If it is assumed that 5 control messages respectively have sizes of 3CB, 1CB, 2CB, 1CB and 3CB, the descending order thereof is [3, 3, 2, 1, 1]. The base station aligns the control messages in this order so as to transmit the control messages. At this time, if pattern information of [3, 3, 2, 1, 1, 1, 1] is indicated as construction information, a UE sequentially decodes the control messages in the units of 3CB, 3CB, 2CB, 1CB, 1CB, 1CB and 1CB and checks whether control messages thereof are present. Since the UE knows in which format the base station transmits the control messages, the complexity of decoding according to the sizes of the control messages is decreased. In addition, since a probability of a control message having a large size being generated due to a modulation and coding scheme is high, complexity may be decreased by using the above described method even during demodulation and decoding.

Embodiment 1

If it is assumed that a total of 16CB are allocated for control messages in a subband generated by dividing a whole band and the sizes of the control messages are allowed up to 1CB to 3CB, 30 pieces of construction information is constructed as shown in Table 2. The base station informs the UE of index information composed of a total of 5 bits.

TABLE 2

| Index | Pattern | CB combination |
|---|---|---|
| 1 | [1, 1, 1, 1, 1, 1, 1, 1, 1, 1, 1, 1, 1, 1, 1, 1] | (1) |
| 2 | [2, 1, 1, 1, 1, 1, 1, 1, 1, 1, 1, 1, 1, 1, 1] | (2, 1) |
| 3 | [2, 2, 1, 1, 1, 1, 1, 1, 1, 1, 1, 1, 1, 1] | (2, 1) |
| 4 | [2, 2, 2, 1, 1, 1, 1, 1, 1, 1, 1, 1, 1] | (2, 1) |
| 5 | [2, 2, 2, 2, 1, 1, 1, 1, 1, 1, 1, 1] | (2, 1) |
| 6 | [2, 2, 2, 2, 2, 1, 1, 1, 1, 1, 1] | (2, 1) |
| 7 | [2, 2, 2, 2, 2, 2, 1, 1, 1, 1] | (2, 1) |
| 8 | [2, 2, 2, 2, 2, 2, 2, 1, 1] | (2, 1) |
| 9 | [2, 2, 2, 2, 2, 2, 2, 2] | (2) |
| 10 | [3, 1, 1, 1, 1, 1, 1, 1, 1, 1, 1, 1, 1, 1] | (3, 1) |
| 11 | [3, 2, 1, 1, 1, 1, 1, 1, 1, 1, 1, 1, 1] | (3, 2, 1) |
| 12 | [3, 2, 2, 1, 1, 1, 1, 1, 1, 1, 1, 1] | (3, 2, 1) |
| 13 | [3, 2, 2, 2, 1, 1, 1, 1, 1, 1, 1] | (3, 2, 1) |
| 14 | [3, 2, 2, 2, 2, 1, 1, 1, 1, 1] | (3, 2, 1) |
| 15 | [3, 2, 2, 2, 2, 2, 1, 1, 1] | (3, 2, 1) |
| 16 | [3, 2, 2, 2, 2, 2, 2, 1] | (3, 2, 1) |
| 17 | [3, 3, 1, 1, 1, 1, 1, 1, 1, 1, 1, 1] | (3, 1) |
| 18 | [3, 3, 2, 1, 1, 1, 1, 1, 1, 1, 1] | (3, 2, 1) |
| 19 | [3, 3, 2, 2, 1, 1, 1, 1, 1, 1] | (3, 2, 1) |
| 20 | [3, 3, 2, 2, 2, 1, 1, 1, 1] | (3, 2, 1) |
| 21 | [3, 3, 2, 2, 2, 2, 1, 1] | (3, 2, 1) |
| 22 | [3, 3, 2, 2, 2, 2, 2] | (3, 2) |
| 23 | [3, 3, 3, 1, 1, 1, 1, 1, 1, 1] | (3, 1) |
| 24 | [3, 3, 3, 2, 1, 1, 1, 1, 1] | (3, 2, 1) |
| 25 | [3, 3, 3, 2, 2, 1, 1, 1] | (3, 2, 1) |
| 26 | [3, 3, 3, 2, 2, 2, 1] | (3, 2, 1) |
| 27 | [3, 3, 3, 3, 1, 1, 1, 1] | (3, 1) |
| 28 | [3, 3, 3, 3, 2, 1, 1] | (3, 2, 1) |
| 29 | [3, 3, 3, 3, 2, 2] | (3, 2) |
| 30 | [3, 3, 3, 3, 3, 1] | (3, 1) |

In a system, a maximum number of control messages which can be transmitted once may be limited. To this end, a maximum number of patterns may be separated from the patterns of Table 1 so as to reconfigure patterns, and the same pattern may be removed so as to reconfigure construction information.

For example, if the maximum number of control messages is limited to 6 in Embodiment 1, the patterns and the indexes may be obtained by reconstructing the result of Table 2. Table 3 shows control message construction information, which is obtained by reconstructing the result of Table 2 if the maximum number of control messages is limited to 6, in the form of a table. That is, 6 control messages are sequentially selected from the left of the patterns of the control messages of Table 2 so as to reconstruct patterns and new indexes are applied to the reconstructed patterns.

TABLE 3

| | | | If the maximum number of control messages is limited (to 6) | | |
|---|---|---|---|---|---|
| Index | Pattern | CB combination | Reconfigured pattern | CB combination | New index |
| 1 | [1, 1, 1, 1, 1, 1, 1, 1, 1, 1, 1, 1, 1, 1, 1, 1] | (1) | [1, 1, 1, 1, 1, 1] | (1) | 1 |
| 2 | [2, 1, 1, 1, 1, 1, 1, 1, 1, 1, 1, 1, 1, 1, 1] | (2, 1) | [2, 1, 1, 1, 1, 1] | (2, 1) | 2 |
| 3 | [2, 2, 1, 1, 1, 1, 1, 1, 1, 1, 1, 1, 1, 1] | (2, 1) | [2, 2, 1, 1, 1, 1] | (2, 1) | 3 |
| 4 | [2, 2, 2, 1, 1, 1, 1, 1, 1, 1, 1, 1, 1] | (2, 1) | [2, 2, 2, 1, 1, 1] | (2, 1) | 4 |
| 5 | [2, 2, 2, 2, 1, 1, 1, 1, 1, 1, 1, 1] | (2, 1) | [2, 2, 2, 2, 1, 1] | (2, 1) | 5 |
| 6 | [2, 2, 2, 2, 2, 1, 1, 1, 1, 1, 1] | (2, 1) | [2, 2, 2, 2, 2, 1] | (2, 1) | 6 |
| 7 | [2, 2, 2, 2, 2, 2, 1, 1, 1, 1] | (2, 1) | [2, 2, 2, 2, 2, 2] | (2) | 7 |
| 8 | [2, 2, 2, 2, 2, 2, 2, 1, 1] | (2, 1) | [2, 2, 2, 2, 2, 2] | (2) | |
| 9 | [2, 2, 2, 2, 2, 2, 2, 2] | (2) | [2, 2, 2, 2, 2, 2] | (2) | |
| 10 | [3, 1, 1, 1, 1, 1, 1, 1, 1, 1, 1, 1, 1, 1] | (3, 1) | [3, 1, 1, 1, 1, 1] | (3, 1) | 8 |
| 11 | [3, 2, 1, 1, 1, 1, 1, 1, 1, 1, 1, 1, 1] | (3, 2, 1) | [3, 2, 1, 1, 1, 1] | (3, 2, 1) | 9 |
| 12 | [3, 2, 2, 1, 1, 1, 1, 1, 1, 1, 1, 1] | (3, 2, 1) | [3, 2, 2, 1, 1, 1] | (3, 2, 1) | 10 |

TABLE 3-continued

| | | | If the maximum number of control messages is limited (to 6) | | |
|---|---|---|---|---|---|
| Index | Pattern | CB combination | Reconfigured pattern | CB combination | New index |
| 13 | [3, 2, 2, 2, 1, 1, 1, 1, 1, 1, 1] | (3, 2, 1) | [3, 2, 2, 2, 1, 1] | (3, 2, 1) | 11 |
| 14 | [3, 2, 2, 2, 2, 1, 1, 1, 1, 1] | (3, 2, 1) | [3, 2, 2, 2, 2, 1] | (3, 2, 1) | 12 |
| 15 | [3, 2, 2, 2, 2, 2, 1, 1, 1] | (3, 2, 1) | [3, 2, 2, 2, 2, 2] | (3, 2) | 13 |
| 16 | [3, 2, 2, 2, 2, 2, 2, 1] | (3, 2, 1) | [3, 2, 2, 2, 2, 2] | (3, 2) | |
| 17 | [3, 3, 1, 1, 1, 1, 1, 1, 1, 1, 1, 1] | (3, 1) | [3, 3, 1, 1, 1, 1] | (3, 1) | 14 |
| 18 | [3, 3, 2, 1, 1, 1, 1, 1, 1, 1, 1] | (3, 2, 1) | [3, 3, 2, 1, 1, 1] | (3, 2, 1) | 15 |
| 19 | [3, 3, 2, 2, 1, 1, 1, 1, 1, 1] | (3, 2, 1) | [3, 3, 2, 2, 1, 1] | (3, 2, 1) | 16 |
| 20 | [3, 3, 2, 2, 2, 1, 1, 1, 1] | (3, 2, 1) | [3, 3, 2, 2, 2, 1] | (3, 2, 1) | 17 |
| 21 | [3, 3, 2, 2, 2, 2, 1, 1] | (3, 2, 1) | [3, 3, 2, 2, 2, 2] | (3, 2) | 18 |
| 22 | [3, 3, 2, 2, 2, 2, 2] | (3, 2) | [3, 3, 2, 2, 2, 2] | (3, 2) | |
| 23 | [3, 3, 3, 1, 1, 1, 1, 1, 1] | (3, 1) | [3, 3, 3, 1, 1, 1] | (3, 1) | 19 |
| 24 | [3, 3, 3, 2, 1, 1, 1, 1, 1] | (3, 2, 1) | [3, 3, 3, 2, 1, 1] | (3, 2, 1) | 20 |
| 25 | [3, 3, 3, 2, 2, 1, 1, 1] | (3, 2, 1) | [3, 3, 3, 2, 2, 1] | (3, 2, 1) | 21 |
| 26 | [3, 3, 3, 2, 2, 2, 1] | (3, 2, 1) | [3, 3, 3, 2, 2, 2] | (3, 2) | 22 |
| 27 | [3, 3, 3, 3, 1, 1, 1, 1] | (3, 1) | [3, 3, 3, 3, 1, 1] | (3, 1) | 23 |
| 28 | [3, 3, 3, 3, 2, 1, 1] | (3, 2, 1) | [3, 3, 3, 3, 2, 1] | (3, 2, 1) | 24 |
| 29 | [3, 3, 3, 3, 2, 2] | (3, 2) | [3, 3, 3, 3, 2, 2] | (3, 2) | 25 |
| 30 | [3, 3, 3, 3, 3, 1] | (3, 1) | [3, 3, 3, 3, 3, 1] | (3, 1) | 26 |

As shown in Table 3, since duplicate patterns are present if the maximum number of control messages is limited to 6, the total number of indexes can be decreased from 30 to 26.

The patterns shown in Table 3 may be partially combined in order to decrease the effective number of transmission bits. For example, a pattern [3, 3, 3, 2, 2, 2, 1] and a pattern [3, 3, 3, 2, 2, 1, 1, 1] may be replaced with a pattern [3, 3, 3, 2, 2, b, 1]. That is, an underlined portion of the pattern [3, 3, 3, 2, 2, 2, 1] and an underlined portion of the pattern [3, 3, 3, 2, 2, 1,1, 1] may be replaced with b so as to indicate [3, 3, 3, 2, 2, b, 1].

Figure 4:
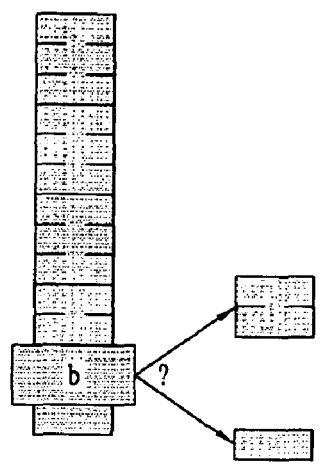
FIG. 4 is a view showing an example of control message construction information for decreasing effective number of transmission bits of control message construction information.

FIG. 4 is a view showing an example of control message construction information for decreasing effective number of transmission bits of control message construction information. As shown in FIG. 4, since b has a size of 1CB or 2CB, it is troublesome that the UE should decode this portion with a size of 2CB and 1CB, but the total number of indexes is decreased when an operation for combining the whole pattern using this principle is performed.

By expanding this principle, a specific portion of the whole pattern may be replaced with "b". For example, the pattern [3, 3, 3, 2, 2, 2, 1] and the pattern [3, 3, 3, 2, 2, 1, 1, 1] may be replaced with [3, 3, 3, 2, b, 1]. That is, underlined portions of the pattern [3, 3, 3, 2, 2,2, 1] and the pattern [3, 3, 3, 2, 2,1,1, 1] may be replaced with "b" so as to indicate [3, 3, 3, 2, b, 1]. At this time, in order to confirm the portion "b", decoding should be performed three times with "2, 2", "2, 1, 1" and "1, 1, 1, 1". Accordingly, the pattern [3, 3, 3, 2, 1, 1, 1, 1, 1] may be considered as the same set. The total number of indexes may be decreased by allowing the system to determine how many CBs are considered with respect to the portion denoted by "b" in advance or by allowing the base station to inform the UE of how many CBs are considered with respect to the portion denoted by "b."

In the use of construction information constructed using this principle, a method for informing the UE of the number of control messages before transmitting control messages and performing indexing according to the reconstructed construction information may be used.

Although the case where the whole band is divided into a plurality of subbands and the control messages are transmitted via allocated subbands is described up to now, the control messages may be constructed without being limited according to the subband. That is, even when the band is actually divided into the plurality of subbands for FFR, the control messages may be transmitted regardless of the subbands. At this time, power boosting may be considered for high-reliability transmission of control messages and is suitable for FFR. The principle of generating the construction information is equal to the above description except that the size value M of the subband and the number of control messages are considered with respect to the whole band.

Meanwhile, the following additional messages may be necessary in addition to the control message construction information.

Information indicating whether or not control messages are present in each of divided subbands if it is assumed that the whole band is divided into K subbands:

For example, this content may be transmitted in a bitmap format. If the whole band is divided into three subbands, a bitmap composed of 3 bits, such as {b1, b2, b3}, may be used. At this time, the bits b1, b2 and b3 sequentially indicate three subbands. Each of the bits of the bitmap has a value "1" if control messages are present in a subband corresponding thereto and has a value "0" if control messages are not present in a subband corresponding thereto. For example, if control messages are present only in a first subband, {b1, b2, b3}={1, 0, 0} is obtained.

Band information:
Total number of control messages
Maximum number (value M) of control messages which can be allowed in the subband
Maximum number of control messages
Number of control messages in each subband The present content is applicable to transmission of Unicast Service Control Channels (USCCHs) of the IEEE802.16m standard. The USCCH is divided into User-Specific Control Information (USCI) and Non-User-Specific Control Information (NUSCI). At this time, when USCI is transmitted, the USCI is separately coded. If there is no information when the USCI is transmitted, a UE should perform blind detection. In this case, a base station should transmit the above-described construction information using a NUSCI or a Broadcast Channel (BCH). The base station aligns the USCI in descending order of the size thereof and transmits the USCI.

Although the construction information is aligned in descending order in the present invention, the present invention is applicable to the alignment of the construction information in ascending order.

Hereinafter, a method for constructing control messages according to a second embodiment of the present invention will be described.

There are various cases where control messages having sizes of 1CB to NCB are present in a band having a size of MCB. However, the base station aligns the control messages in descending order and transmits the control messages. Accordingly, in this case, the number of cases is limited and the pattern thereof is also limited. Accordingly, a method for aligning the control messages in descending order and generating groups according to the sizes thereof is suggested. For example, after the control messages are modulated and/or coded, the control messages having a size of 1CB are grouped into Group 1 and the control messages having a size of 2CB are grouped into Group 2. Accordingly, the number of groups is equal to the number of types of the sizes of the control messages. The number of all possible groups is considered while setting the size of the sum of all the control messages to M or less.

Embodiment 2

The following Table 4 shows an example of constructing construction information when it is assumed that the value M of the system is 5 and 1CB, 2CB and 4CB allowed as the sizes of the control messages. In Table 4, Group 1 is a group of control messages having a size of 1CB, Group 2 is a group of control messages having a size of 2CB, and Group 3 is a group of control messages having a size of 4CB.

TABLE 4

| Index | Group 1 (1CB) | Group 2 (2CB) | Group 3 (4CB) |
|---|---|---|---|
| 0 | 0 | 0 | 0 |
| 1 | 1 | 0 | 0 |
| 2 | 2 | 0 | 0 |
| 3 | 3 | 0 | 0 |
| 4 | 4 | 0 | 0 |
| 5 | 5 | 0 | 0 |
| 6 | 0 | 1 | 0 |
| 7 | 1 | 1 | 0 |
| 8 | 2 | 1 | 0 |
| 9 | 3 | 1 | 0 |
| 10 | 0 | 2 | 0 |
| 11 | 1 | 2 | 0 |
| 12 | 0 | 0 | 1 |
| 13 | 1 | 0 | 1 |

As can be seen from Table 4, the total size of all the control messages having a certain index is equal to or less than M (5 in the present embodiment). As in the above example, Group 1 to Group 3 may be sequentially connected such that the values thereof are aligned in descending or ascending order. The other methods, e.g., a method for performing alignment in order of total sizes of all the control messages (ascending order or descending order) and the like may be considered.

Embodiment 3

The following Table 5 shows the construction of a control message alignment pattern aligned according to the total sizes of all the control messages using Table 4. In Table 5, Group 1 is a group of control messages having a size of 1CB, Group 2 is a group of control messages having a size of 2CB, and Group 3 is a group of control messages having a size of 4CB. In addition, in Table 5, Group 1 to Group 3 are denoted by G1, G2 and G3, respectively. Value in the parentheses in each of the groups denote the number of control messages belonging to the group.

TABLE 5

| Index | Total size of control messages [Unit: CB] | | | | |
|---|---|---|---|---|---|
| 2 | 1 | 2 | 3 | 4 | 5 |
| 1 | G1(1), G2(0), G3(0) | G1(2), G2(0), G3(0) | G1(3), G2(0), G3(0) | G1(4), G2(0), G3(0) | G1(5), G2(0), G3(0) |
| 2 | — | G1(0), G2(1), G3(0) | G1(1), G2(1), G3(0) | G1(2), G2(1), G3(0) | G1(3), G2(1), G3(0) |
| 3 | — | — | — | G1(0), G2(2), G3(0) | G1(1), G2(2), G3(0) |
| 4 | — | — | — | G1(0), G2(0), G3(1) | G1(1), G2(0), G3(1) |

All 13 types (Indexes 1 to 13) of Embodiment 1 are shown in Table 5. Accordingly, the indexes indicating the control message construction can be sequentially generated by referring to the total size of the control messages and the value of Index 2 of Table 5.

Embodiment 4

According to another embodiment of the present invention, in order to decrease the effective number of bits of the transmitted index, all possible combinations of each group excluding a specific group n may be considered while the total size of all the control messages is fixed to M. The control message corresponding to the excluded Group n may be included in blind decoding. For example, if n=1 and M=5, the UE may perform blind decoding with respect to the control message included in Group 1 (group having a size of 1CB). The following Table 6 shows the construction of a control message alignment pattern excluding Group 1.

TABLE 6

| Index | Group 1 (1CB) | Group 2 (2CB) | Group 3 (4CB) |
|---|---|---|---|
| 0 | 0-5 | 0 | 0 |
| 1 | 0-3 | 1 | 0 |
| 2 | 0 or 1 | 2 | 0 |
| 3 | 0 or 1 | 0 | 1 |

That is, in Table 6, if an index is 1, the number of control messages having a size of 2CB is 1, the number of control messages having a size of 4CB is 0, and the number of control messages having a size of 1CB is any one of 0 to 3. If it is assumed that a base station aligns control messages in order of size and transmits the control messages, Group 3 and Group 2 are decoded first and the remaining control messages are blind-decoded in the unit of 1CB up to the total size (M) of the control messages.

Meanwhile, in order to reduce complexity of blind decoding in the unit of 1CB, a base station may further transmit the following information together with an index.

The number of control messages included in Group 1 or total size of Group 1

The total number of control messages included in each of the groups and the total size (e.g., CB or Resource Unit (RU) size) of bands (Group 1 to 3) occupied by actual control messages In the use of construction information constructed by such a principle, a method for first informing the UE of the number of control messages or the size of the resource used (e.g., the number of CBs or the number of RUs) before transmitting the control messages and then performing indexing may save the UE efforts for performing additional blind detection, by informing the UE of the total number of control messages which are currently constructed or the size thereof in advance.

Meanwhile, the total number of control messages or the size thereof may be changed according to the situation of the system. For example, the value M may be changed according to the bandwidth of the system or the increase in the number of control messages to be transmitted to the UE in the system. Since the above-described methods consider the total number of cases when the value M is changed, the number of all cases considering $M_1$ is a subset of the number of all cases considering $M_2$ with respect to different values of M ($M_1<M_2$). Accordingly, a method for preparing a table with respect to a largest value M allowed by the system and reconstructing and using indexes according to the change of the value M may be considered.

For example, although, in Embodiment 2, if M=5 and construction is performed as shown in Table 4 such that all the values (total size of control messages is 1CB to 5CB) of the table are used, indexes may be reconstructed in consideration of the total size of control messages of 1CB to 4CB when the value M is changed to 4.

Meanwhile, a specific group may be subjected to blind decoding in order to reduce the effective number of bits of the index. The following Table 7 is obtained if a group having n=1, that is, Group 1 (group having a size of 1CB), is subjected to blind decoding as in Embodiment 3.

TABLE 7

| Index | M [Unit: CB] | | | | |
|---|---|---|---|---|---|
| 2 | 1 | 2 | 3 | 4 | 5 |
| 0 | G1(0-1), G2(0), G3(0) | G1(0-2), G2(0), G3(0) | G1(0-3), G2(0), G3(0) | G1(0-4), G2(0), G3(0) | G1(0-5), G2(0), G3(0) |
| 1 | — | G1(0), G2(1), G3(0) | G1(0-1), G2(1), G3(0) | G1(0-2), G2(1), G3(0) | G1(0-3), G2(1), G3(0) |
| 2 | — | — | — | G1(0), G2(2), G3(0) | G1(0-1), G2(2), G3(0) |
| 3 | — | — | — | G1(0), G2(0), G3(1) | G1(0-1), G2(0), G3(1) |

If the value M requested by the system is transmitted to all UEs (e.g., using a BCH), Index 2 which is the control message construction corresponding to the value M is used.

As another method using Table 6, if the total number of control messages constructed in a current frame is N ($0 \leq N \leq M$), a band corresponding thereto is found in Table 6 using the value N instead of the value M and construction information is informed using Index 2 corresponding thereto. The following Table 8 shows construction information constructed when the total number of control messages constructed in the current frame is N.

TABLE 8

| Index | N [Unit: CB] | | | | |
|---|---|---|---|---|---|
| 2 | 1 | 2 | 3 | 4 | 5 |
| 0 | G1(1-1), G2(0), G3(0) | G1(1-2), G2(0), G3(0) | G1(1-3), G2(0), G3(0) | G1(1-4), G2(0), G3(0) | G1(1-5), G2(0), G3(0) |
| 1 | — | G1(0), G2(1), G3(0) | G1(0-1), G2(1), G3(0) | G1(0-2), G2(1), G3(0) | G1(0-3), G2(1), G3(0) |
| 2 | — | — | — | G1(0), G2(2), G3(0) | G1(0-1), G2(2), G3(0) |
| 3 | — | — | — | G1(0), G2(0), G3(1) | G1(0-1), G2(0), G3(1) |

That is, if the value N is 5 and Index 2 is 1, construction information is G1(0-3), G2(1), G3(0), and, if the value N is 3 and Index 2 is 1, construction information is G1(0-1), G2(1) and G3(0). At this time, 2 bits are necessary for indicating Index 2 when the value N is 5, but only 1 bit is necessary for indicating Index 2 when the value N is 3. That is, since the effective number of bits for indicating Index 2 is automatically determined using Table 8 by setting the value M, the number of bits necessary for indicating construction information is decreased.

Table 7 may be generated from Table 5.

Since Group 1 is subjected to blind decoding, the band of Group 1 in Table 5 is changed and applied. Accordingly, the same table may be used when the system performs transmission in consideration of the number of all cases as in Embodiment 2 and when a specific group is subjected to blind decoding as in Embodiment 3.

When the number of all possible cases is considered and when some groups are subjected to blind decoding, the system may inform all the UEs of the features of this construction information using a BCH or Non-User-Specific Control Information (NUSCI). In this case, the construction shown in Table 4 or Table 6 may be efficiently used.

In all the above-described methods, if there is no control message, an index corresponding thereto may be omitted. For example, in Embodiments 1 to 3, when the number of control messages is 0 in Group 1 to 3, an index corresponding thereto is not necessary if the total number of control messages included in each group is known.

The present invention is applicable to transmission of USCCHs of the IEEE802.16m standard. The USCCH is divided into USCI and NUSCI. At this time, when USCIs are transmitted, the USCI is separately coded. If there is no information when the USCI is transmitted, a UE should perform blind detection. In this case, a base station should transmit the above-described construction information using a NUSCI or a BCH. The base station aligns the USCI in descending order of the size and transmits the USCI.

Although the construction information described in the present invention is aligned in descending order, the present invention is applicable to the construction information aligned in ascending order.

Embodiment 5

The value M may be actually changed according to the construction of the system. The following Table 9 shows indexes according to various values M which may be constructed in the system. G1, G2, G3, G4 and G5 denote the cases where the sizes of the control messages are respectively 1CB, 2CB, 4CB, 8CB and 16CB. Group 1 may be omitted because a UE performs blind detection from a point of time, when Group 2 is completed, to MCB.

TABLE 9

| Index | M [Unit: CB] | | | | |
|---|---|---|---|---|---|
| 2 | 1 | 2 | 3 | 4 | 5 |
| 0 | G1(0-1), G2(0), G3(0), G4(0), G5(0) | G1(0-2), G2(0), G3(0), G4(0), G5(0) | G1(0-3), G2(0), G3(0), G4(0), G5(0) | G1(0-4), G2(0), G3(0), G4(0), G5(0) | G1(0-5), G2(0), G3(0), G4(0), G5(0) |
| 1 | — | G1(0), G2(1), G3(0), G4(0), G5(0) | G1(0-1), G2(1), G3(0), G4(0), G5(0) | G1(0-2), G2(1), G3(0), G4(0), G5(0) | G1(0-3), G2(1), G3(0), G4(0), G5(0) |
| 2 | — | — | — | G1(0), G2(2), G3(0), G4(0), G5(0) | G1(0-1), G2(2), G3(0), G4(0), G5(0) |
| 3 | — | — | — | G1(0), G2(0), G3(1), G4(0), G5(0) | G1(0-1), G2(0), G3(1), G4(0), G5(0) |

| Index | M [Unit: CB] | | | | |
|---|---|---|---|---|---|
| 2 | 6 | 7 | 8 | 9 | 10 |
| 0 | G1(0-6), G2(0), G3(0), G4(0), G5(0) | G1(0-7), G2(0), G3(0), G4(0), G5(0) | G1(0-8), G2(0), G3(0), G4(0), G5(0) | G1(0-9), G2(0), G3(0), G4(0), G5(0) | G1(0-10), G2(0), G3(0), G4(0), G5(0) |
| 1 | G1(0-4), G2(1), G3(0), G4(0), G5(0) | G1(0-5), G2(1), G3(0), G4(0), G5(0) | G1(0-6), G2(1), G3(0), G4(0), G5(0) | G1(0-7), G2(1), G3(0), G4(0), G5(0) | G1(0-8), G2(1), G3(0), G4(0), G5(0) |
| 2 | G1(0-2), G2(2), G3(0), G4(0), G5(0) | G1(0-3), G2(2), G3(0), G4(0), G5(0) | G1(0-4), G2(2), G3(0), G4(0), G5(0) | G1(0-5), G2(2), G3(0), G4(0), G5(0) | G1(0-6), G2(2), G3(0), G4(0), G5(0) |
| 3 | G1(0), G2(3), G3(0), G4(0), G5(0) | G1(0-1), G2(3), G3(0), G4(0), G5(0) | G1(0-2), G2(3), G3(0), G4(0), G5(0) | G1(0-3), G2(3), G3(0), G4(0), G5(0) | G1(0-4), G2(3), G3(0), G4(0), G5(0) |
| 4 | G1(0-2), G2(0), G3(1), G4(0), G5(0) | G1(0-3), G2(0), G3(1), G4(0), G5(0) | G1(0), G2(4), G3(0), G4(0), G5(0) | G1(0-1), G2(4), G3(0), G4(0), G5(0) | G1(0-2), G2(4), G3(0), G4(0), G5(0) |
| 5 | G1(0), G2(1), G3(1), G4(0), G5(0) | G1(0-1), G2(1), G3(1), G4(0), G5(0) | G1(0-4), G2(0), G3(1), G4(0), G5(0) | G1(0-5), G2(0), G3(1), G4(0), G5(0) | G1(0), G2(5), G3(0), G4(0), G5(0) |
| 6 | | | G1(0-2), G2(1), G3(1), G4(0), G5(0) | G1(0-3), G2(1), G3(1), G4(0), G5(0) | G1(0-6), G2(0), G3(1), G4(0), G5(0) |
| 7 | | | G1(0), G2(2), G3(1), G4(0), G5(0) | G1(0-1), G2(2), G3(1), G4(0), G5(0) | G1(0-4), G2(1), G3(1), G4(0), G5(0) |
| 8 | | | G1(0), G2(0), G3(2), G4(0), G5(0) | G1(0-1), G2(0), G3(2), G4(0), G5(0) | G1(0-2), G2(2), G3(1), G4(0), G5(0) |

TABLE 9-continued

| | | | |
|---|---|---|---|
| 9 | G1(0), G2(0), G3(0), G4(1), G5(0) | G1(0-1), G2(0), G3(0), G4(1), G5(0) | G1(0), G2(3), G3(1), G4(0), G5(0) |
| 10 | | | G1(0-2), G2(0), G3(2), G4(0), G5(0) |
| 11 | | | G1(0), G2(1), G3(2), G4(0), G5(0) |
| 12 | | | G1(0-2), G2(0), G3(0), G4(1), G5(0) |
| 13 | | | G1(0), G2(1), G3(0), G4(1), G5(0) |

In Table 9, at an index 0, Group 1 is denoted by G1(0-M). If the number of control messages which are currently transmitted (or the total size of control messages) is separately transmitted, G1(0-M) of Group 1 indicated at an index 0 may be represented by G1(1-M). This is because, if the number of control messages (or the total size of control messages) is 0, there is no control message to be transmitted. As the construction table, that obtained by switching Table 7 to Table 8 in Embodiment 4 may be used without modification. That is, indexes may be generated based on the total number of control messages, which are currently constructed, in consideration of the value N, instead of the value M.

Examples of the method for setting the groups include the following various methods in addition to the method using the size.

A downlink control message is actually modulated and coded so as to be transmitted. At this time, in order to apply a Modulation and Coding Scheme (MCS), the downlink control message may be segmented into a plurality of subblocks. For convenience, the downlink control message is called a downlink control message Information Element (IE), a segmented subblock is called an extended IE, and a control signal which is actually transmitted after applying the MCS is called an allocated IE. In addition, the basic size unit of the allocated IE is called a Minimum A-MAP Logical Resource Unit (MLRU). Control messages are transmitted in a state of being grouped according to a specific purpose, and suitable information about grouping is transmitted. For example, the examples of the downlink control message IE may include a downlink/uplink (DL/UL) basic assignment IE, a UL basic assignment IE, a DL/UL group resource allocation IE, and a DL/UL persistent IE.

The following cases may be considered as the example of the grouping method.

In a first case, grouping is performed such that control messages are divided into control messages for allowing a UL ACK/NACK channel index to be implicitly used and otherwise. For example, control messages may be grouped into a group 1 composed of DL basic assignment IEs and a group 2 composed of the other types of IEs.

In a second case, grouping is performed such that control messages are divided into control messages of a user who may implicitly use a UL ACK/NACK channel index and otherwise. For example, control messages may be grouped into a group 1 composed of DL/UL basic assignment IEs and a group 2 composed of the other types of IEs. At this time, the control message IEs of one user may be successively transmitted.

In the first and second cases, the examples of the method of implicitly using the ACK/NACK channel index include a method of using the order of control messages as the ACK/NACK channel index. That is, if such grouping method is used, supplementary signaling for the ACK/NACK channel index is not necessary.

In a third case, grouping is performed according to the sizes of control message IEs. For example, the control messages may be grouped into a group 1 composed of control messages having a size of 56 bits and a group 2 composed of control messages having a size of 90 bits.

In a fourth case, grouping is performed according to an extended IE and a non-extended IE. That is, control messages may be grouped into a group 1 composed of extended IEs and a group 2 composed of the other types of IEs (e.g., basic IEs). The extended IEs refer to subblocks generated by segmenting an original control message into a plurality of portions if the amount of information of the original control message exceeds the length of the basic control message allowed by the system as described above. At this time, the extended IEs segmented into the plurality of subblocks may be successively transmitted.

In a fifth case, grouping is performed according to MCS levels. For example, control messages may be grouped into a group 1 composed of control messages having an MCS level of Qaudrature Phase Shift Keying (QPSK) ½ and a group 2 composed of control messages having an MCS level of QPSK⅛.

In a sixth case, grouping is performed according to the sizes of the allocated IEs. For example, control messages may be grouped into a group 1 composed of 2MLRUs and a group 2 composed of 4MLRUs. The allocated IEs refer to those allocated to actual resource areas after applying the MCS to the control messages as described above.

In a seventh case, a combination of the grouping methods of the first case to the sixth case is used.

For example, after control messages are grouped according to the third case, the fifth case may be applied to the groups generated by the grouping. For example, control messages may be grouped into a group 1 composed of control messages having a size of 56 bits and an MCS level of QPSK ½, a group 2 composed of control messages having a size of 56 bits and an MCS level of QPSK ⅛, a group 3 composed of control messages having a size of 90 bits and an MCS level of QPSK ½, and a group 4 composed of control messages having a size of 90 bits and an MCS level of QPSK ⅛.

The number of groups may be changed according to circumference and the method may be changed according to the purpose thereof.

Embodiment 6

The grouping method may be performed according to the MCS levels instead of sizes. That is, blind detection may be performed by performing grouping according to the MCS levels of the control messages and informing the UE of the number of control messages in each group.

For example, if control messages are modulated/demodulated and coded using QPSK 1/16 (MCS4), QPSK 1/8 (MCS3), QPSK 1/4 (MCS2) and QPSK 1/2 (MCS1), indexes are generated and transmitted by the above-described method using construction information indicating how many control messages are present in each MCS level.

Meanwhile, in the case where a base station transmits construction information according to the sizes thereof, blind detection can be easily performed by aligning construction information according to the MCS levels in each of the groups divided according to sizes (aligning construction information in order of from MCS1 to MCS4 or from MCS4 to MCS1) and transmitting the construction information. In contrast, in the case where groups are constructed according to MCS levels, blind detection can be easily performed by aligning construction information (in descending order or ascending order) according to the sizes thereof in each group and transmitting the construction information.

Meanwhile, in the transmission of each group, the number of control messages in each actual group may be directly signaled.

Figure 5:
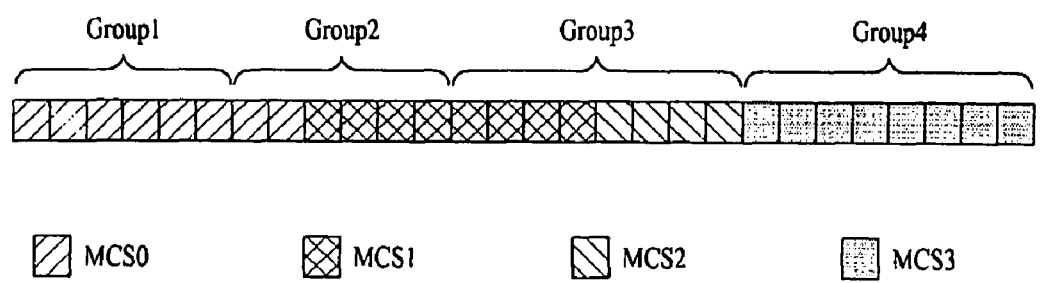
FIG. 5 is a view showing a control message alignment pattern according to an embodiment of the present invention.

An example of the above-described control messages, an Advanced-MAP (A-MAP) Information Element (IE) of an IEEE802.16m system may be considered. If grouping is performed according to the sizes of A-MAP resource allocation units (hereinafter, referred to as A-MAP IE allocation units) allocated to actual A-MAP channels after applying modulation/demodulation coding to A-MAP IEs, the sizes of the A-MAP IE allocation units present in each group may be set to be equal. FIG. 5 is a view showing a control message alignment pattern according to an embodiment of the present invention. As shown in FIG. 5, after applying modulation/demodulation coding, the A-MAP IE allocation units are aligned according to the sizes thereof and the A-MAP IE allocation units having the same size to configure a group.

After applying modulation/demodulation coding to A-MAP IEs, the A-MAP IE allocation units allocated to actual A-MAP channels may be aligned according to the sizes thereof, and the A-MAP IE allocation units may be aligned according to the MCS levels thereof within the A-MAP IE allocation units having the same size.

Figure 6:
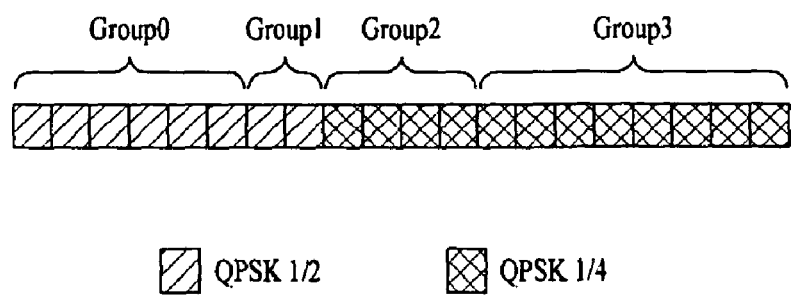
FIG. 6 is a view showing a control message alignment pattern according to an embodiment of the present invention.

FIG. 6 is a view showing a control message alignment pattern according to an embodiment of the present invention.

As shown in FIG. 6, A-MAP IE allocation units having the same MCS level and the same size may be grouped. If A-MAP IEs having a size of 1MLRU and 2MLRU are present and modulation/demodulation coding such as QPSK 1/2 and QPSK 1/4 (the types of the MCS may be differently applied) is performed with respect to the A-MAP IEs, the sizes of the A-MAP IE allocation units allocated to the actual A-MAP channels are 1MLRU, 2MLRU and 4MLRU. The MLRU is the unit size of the A-MAP IE. At this time, those obtained by performing modulation/demodulation coding with respect to A-MAP IEs having 1MLRU using QPSK 1/2 are present as the A-MAP IE allocation unit having a size of 1MLRU, those obtained by performing modulation/demodulation coding with respect to A-MAP IEs having 2MLRU using QPSK 1/2 and those obtained by performing modulation/demodulation coding with respect to A-MAP IEs having 1MLRU using QPSK 1/4 are present as the A-MAP IE allocation unit having a size of 2MLRU, and those obtained by performing modulation/demodulation coding with respect to A-MAP IEs having 2MLRU using QPSK 1/4 are present as the A-MAP IE allocation units having a size of 4MLRU. Accordingly, a total of 4 groups are present, and index information defined by the size of each group (or the number of A-MAP IE allocation units) or a specific pattern may be transmitted in order to easily perform blind detection. The above information may be transmitted via a non-user-specific A-MAP.

Figure 7:
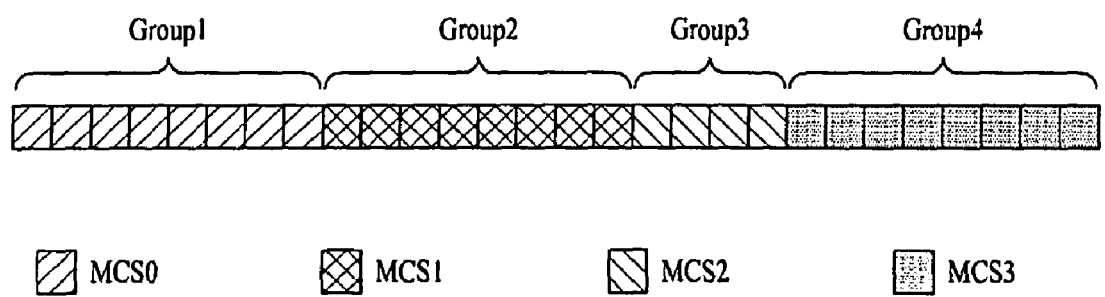
FIG. 7 is a view showing a control message alignment pattern according to an embodiment of the present invention.

Meanwhile, if the A-MAP IE allocation units are grouped according to the MCS levels thereof, the sizes of the A-MAP IE allocation units present in the groups may be different, but the MCS levels of the A-MAP IE allocation units present in the groups may be set to be equal. FIG. 7 is a view showing a control message alignment pattern according to an embodiment of the present invention. In FIG. 7, A-MAP IE allocation units are grouped according to the MCS levels thereof after applying modulation/demodulation coding to A-MAP IEs.

Figure 8:
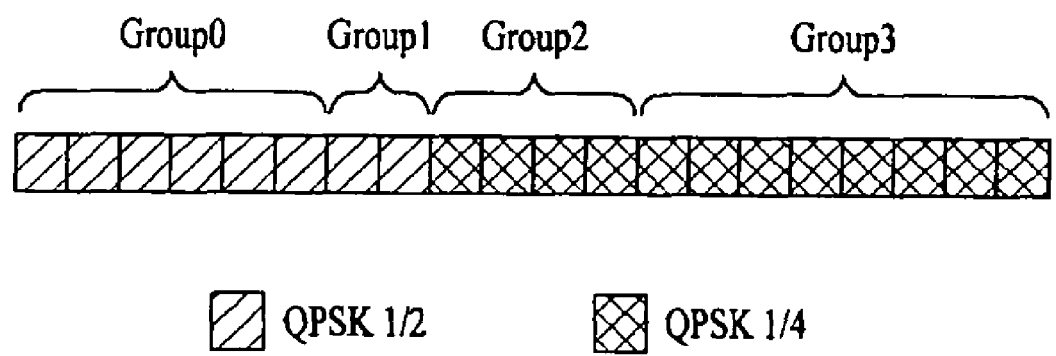
FIG. 8 is a view showing a control message alignment pattern according to an embodiment of the present invention.

After applying modulation/demodulation coding to A-MAP IEs, the A-MAP IE allocation units allocated to the actual A-MAP channels may be aligned according to MCS levels and may be realigned according to the sizes thereof within the A-MAP IE allocation units having the same MCS levels. FIG. 8 is a view showing a control message alignment pattern according to an embodiment of the present invention. As shown in FIG. 8, A-MAP IE allocation units having the same MCS level and the same size may be grouped. If it is assumed that A-MAP IEs having a size of 1MLRU and 2MULRU are present and modulation/demodulation is performed with respect to the A-MAP IEs using QPSK 1/2 and QPSK 1/4 (the type of the MCS may be differently applied), the sizes of the A-MAP IE allocation units allocated to the actual A-MAP channels are 1MLRU, 2MLRU and 4MLRU. At this time, those obtained by performing modulation/demodulation coding with respect to A-MAP IEs having 1MLRU using QPSK 1/2 are present as the A-MAP IE allocation unit having a size of 1MLRU, those obtained by performing modulation/demodulation coding with respect to A-MAP IEs having 2MLRU using QPSK 1/2 and those obtained by performing modulation/demodulation coding with respect to A-MAP IEs having 1MLRU using QPSK 1/4 are present as the A-MAP IE allocation unit having a size of 2MLRU, and those obtained by performing modulation/demodulation coding with respect to A-MAP IEs having 2MLRU are present as the A-MAP IE allocation unit having a size of 4MLRU. Accordingly, a total of 4 groups are present, and index information defined by the size of each group (or the number of A-MAP IE allocation units) or a specific pattern is transmitted in order to easily perform blind detection. The above information may be transmitted via a non-user-specific A-MAP.

A method for broadcasting such information to all UEs within a cell may be considered as a method for informing the UE of such information.

In the IEEE802.16m system, the above information may be transmitted using a non-user-specific A-MAP or a Superframe Header (SFH).

At this time, in the non-user specific A-MAP, if multiple frequency partitioning such as FFR is applied, the case where a non-user-specific A-MAP is present in each partition, the case where A-MAP construction information of a certain partition is indicated by a non-user-specific A-MAP allocated to another partition, and the case where a non-user-specific A-MAP is present in a reuse partition one by one may be considered. When the non-user-specific A-MAP is present in each partition, the A-MAP construction information of the partition suggested by the present invention is transmitted by the partition.

In the case where a non-user-specific A-MAP is not present in all partitions, the A-MAP construction information of a certain partition may be indicated by a non-user-specific A-MAP allocated to another partition. For example, if a reuse 1 partition and a reuse 3 partition are simultaneously applied, the transmission of the non-user-specific A-MAP only by the power boosting reuse-N partition or reuse 1 partition may be considered. At this time, a method for transmitting A-MAP construction information (index information using the above-described index generating method, the size of each group or the number of A-MAP IE allocation units) of each partition to the non-user-specific A-MAP may be applied. In addition, if the non-user-specific A-MAP is transmitted by the power boosting specific reuse-N partition and reuse 1 partition, A-MAP information corresponding to the partition may be indicated by the non-user-specific A-MAP of the partition.

A group may be defined by the total size of A-MAP IE allocation units of each partition. That is, if a total of four partitions are configured by applying multiple partitioning, four groups are present, and a UE may be informed of index information using the above-described index generating method or the size of each group according to partitions (or the number of A-MAP IE allocation units) using a non-user-specific A-MAP or a SFH.

The A-MAP construction information of the partition suggested by the present invention when a non-user-specific A-MAP is present in each partition is transmitted by the partition.

Hereinafter, the construction of a non-user-specific A-MAP and a method for transmitting the construction information when multiple Frequency Partitions (FPs) such as FFR are applied in a system will be described.

The number of FPs which may be considered for the same reason of FFR may be determined according to an operation method. For example, if FFR ⅓ (that is, a frequency reuse rate related to FFR is ⅓) is applied as an FFR scheme, the number of FPs is three and, if FFR ⅓ and FFR 1 are applied, the number of FPs is four.

In consideration of the characteristics (e.g., power boosting) of the FPs, a specific MCS level may be limited and used according to FPs. For example, QPSK ½ is applied to a power boosting FP, QPSK ½ and/or QPSK ⅛ is applied to an FFR 1 partition, and QPSK ⅛ is applied to a powered-down FP.

Meanwhile, control messages may be present in all FPs or only in a predetermined FP. If control messages are present only in the predetermined FP, for example, in FFR ⅓, control messages may be present only in a power boosting FP, and, in FFR ⅓ and FFR 1, control messages may be present only in a power boosting FP and/or an FP of FFR 1.

In addition, if control messages are grouped and transmitted, the grouping method suggested by the present invention may be applied to an FP in which the control messages are present.

Hereinafter, examples of grouping and transmitting control messages in a system to which FFR is applied will be described.

Figure 9:
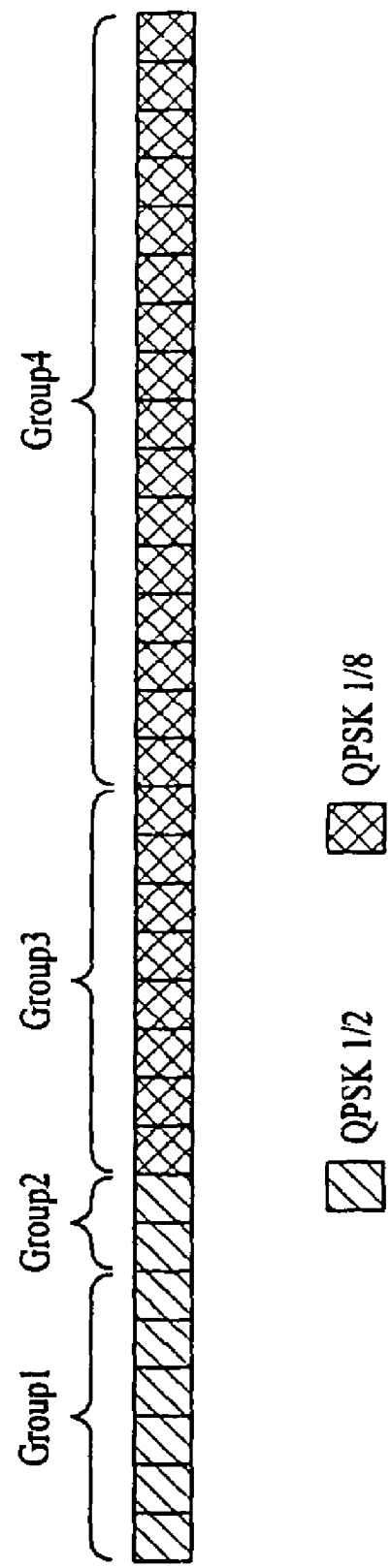
FIGS. 9 to 13 are views showing control message alignment patterns if Fractional Frequency Reuse (FFR) is applied, according to an embodiment of the present invention.

In a first example, it is assumed that there are A type and E type in the size of an Assignment (A)-A-MAP IE, the number of FPs is 1 (FFR 1 is applied), and QPSK ½ and QPSK ⅛ are applied as available MCSs. QPSK ½ and QPSK ⅛ are applied to the A type such that a 1MLRU allocation unit and a 4MLRU allocation unit are generated and QPSK ½ and QPSK ⅛ are applied to the B type such that a 2MLRU allocation unit and an 8MLRU allocation unit are generated. Accordingly, after applying the MCS, 1MLRU, 2MLRU, 4MLRU and 8MLRU are present as the A-MAP IE allocation unit. The generated 1MLRU may be set to a group 1, the 2MLRU may be set to a group 2, the 4MLRU may be set to a group 3 and the 8MLRU may be set to a group 4. At this time, the maximum number of A-A-MAP IEs which can be transmitted may be determined according to the size of the resource area allocated for A-A-MAP. FIG. 9 is a view showing a control message alignment pattern if FFR is applied, according to an embodiment of the present invention. As shown in FIG. 9, the generated MLRUs may map resources having the same IE size and the same MCS level to groups composed of logically consecutive MLRUs.

Figure 10:
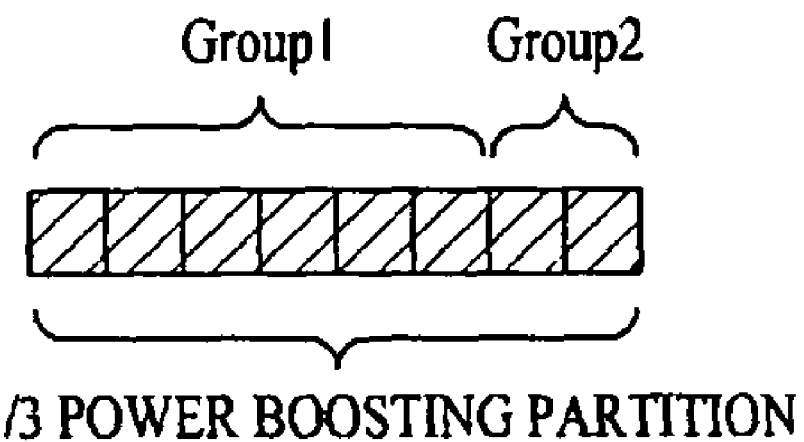
Figure 10:

In a second example, it is assumed that there are A type and B type in the size of an A-A-MAP IE, and the number of FPs is 3 (FFR ⅓ is applied). In addition, the A-A-MAP is present only in a power boosting partition and the used MCS is limited to QPSK ½. Since the QPSK ½ is applied to the A type and the B type such that a 1MLRU allocation unit and a 2MLRU allocation unit are generated, after applying the MCS, 1MLRU and 2MLRU are present as the A-A-MAP IE allocation unit. The generated 1MLRU is set to a group 1 and the 2MLRU is set to a group 2. FIG. 10 is a view showing a control message alignment pattern if FFR is applied, according to an embodiment of the present invention. As shown in FIG. 10, it is possible to map resources having the same IE size and the same MCS level to groups composed of logically consecutive MLRUs.

Figure 11:
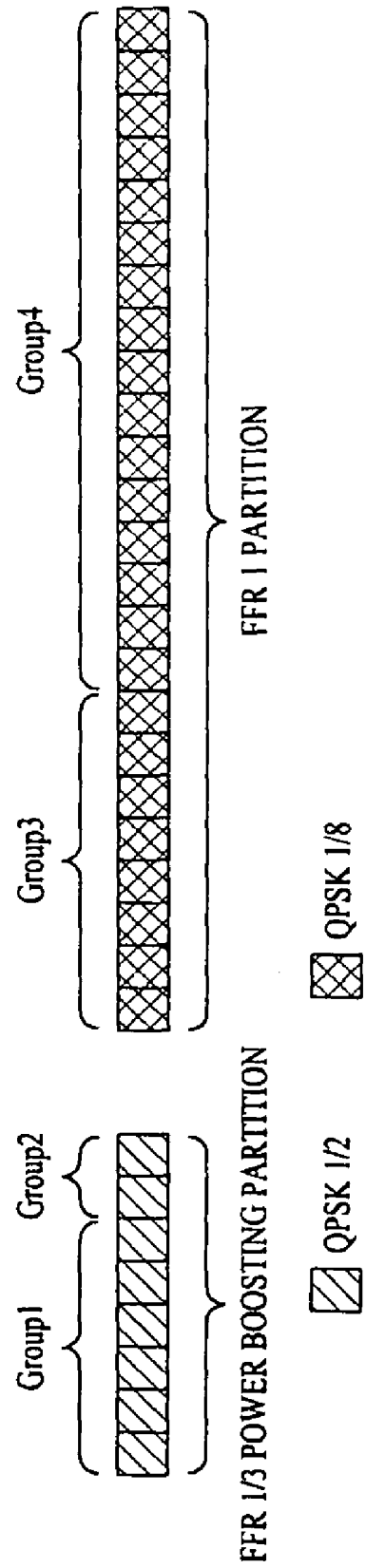

In a third example, it is assumed that there are A type and B type in the size of an A-A-MAP IE, and the number of FPs is 4 (FFR ⅓ and FFR 1 are applied). In consideration of the characteristics (e.g., power boosting) of the FPs, a specific MCS level is limited and used according to FPs. For example, QPSK ½ is applied to an FFR ⅓ power boosting partition, and QPSK ⅛ is applied to an FFR 1 partition, as an available MCS. QPSK ½ is applied to the A type and the B type in the FFR ⅓ power boosting partition such that a 1MLRU allocation unit and a 2MLRU allocation unit are generated, and QPSK ⅛ is applied to the A type and the B type in an FFR 1 partition such that a 4MLRU allocation unit and an 8MLRU allocation unit are generated. Accordingly, in this case, after applying the MCS, 1MLRU, 2MLRU, 4MLRU and 8MLRU are present as the A-A-MAP IE allocation unit. The generated 1MLRU may be set to a group 1, the 2MLRU may be set to a group 2, the 4MLRU may be set to a group 3, and the 8MLRU may be set to a group 4. FIG. 11 is a view showing a control message alignment pattern if FFR is applied, according to an embodiment of the present invention. As shown in FIG. 10, it is possible to map resources having the same IE size and the same MCS level to groups composed of logically consecutive MLRUs.

In a fourth example, it is assumed that there are A type and B type in the size of an A-A-MAP IE, and the number of FPs is 4 (FFR ⅓ and FFR 1 are applied). In consideration of the characteristics (e.g., power boosting) of the FPs, a specific MCS level is limited and used according to FPs. For example, QPSK ½ is applied to an FFR ⅓ power boosting partition, and QPSK ½ and QPSK ⅛ are applied to an FFR 1 partition as an available MCS. QPSK ½ is applied to the A type and the B type in the FFR ⅓ power boosting partition such that a 1MLRU allocation unit and a 2MLRU allocation unit are generated, QPSK ½ is applied to the A type and the B type in an FFR 1 partition such that a 1MLRU allocation unit and a 2MLRU allocation unit are generated, and QPSK ⅛ is applied to the A type and the B type such that a 4MLRU allocation unit and an 8MLRU allocation unit are generated.

Figure 12:
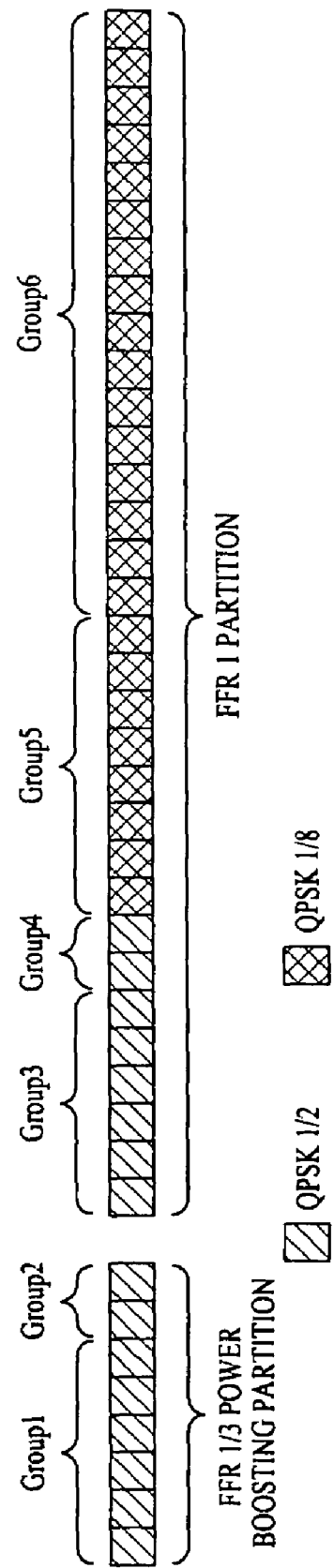

In this case, after applying the MCS, 1MLRU, 2MLRU, 4MLRU and 8MLRU are present as the A-MAP IE allocation unit. The 1MLRU allocation unit of the FFR ⅓ power boosting partition may be set to a group 1, the 2MLRU may be set to a group 2, the 1MLRU allocation unit of the FFR 1 partition may be set to a group 3, the 2MLRU may be set to a group 4, the 4MLRU may be set to a group 5, and the 8MLRU may be set to a group 6. FIG. 12 is a view showing a control message alignment pattern if FFR is applied, according to an embodiment of the present invention. As shown in FIG. 12, the generated MLRUs may map resources having the same IE size and the same MCS level to groups composed of logically consecutive MLRUs. At this time, if the resources have the same MCS level and the same IE size but are present in different FPs, resources may be mapped to different groups.

In a fifth example, it is assumed that there are A type and B type in the size of an A-A-MAP IE, and the number of FPs is 4 (FFR ⅓ and FFR 1 are applied). The same MCS level is limited and used in all the FPs and a power level may be adjusted as necessary in order to maintain link performance. For example, QPSK ½ may be used as an available MCS. QPSK ½ is applied to the A type and the B type in the FFR ⅓ power boosting partition such that a 1MLRU allocation unit and a 2MLRU allocation unit are generated, and QPSK ½ is applied to the A type and the B type in the FFR 1 partition such that a 1MLRU allocation unit and a 2MLRU allocation unit are generated.

Figure 13:
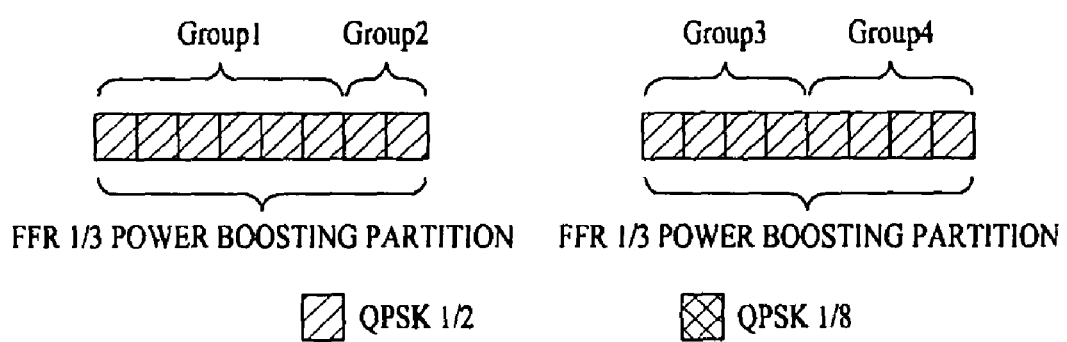

At this time, if the A-A-MAPs have the same MCS level and the same IE size but are present in different FPs, the A-A-MAPs may be grouped to different groups. Accordingly, the 1MLRU allocation unit of the FFR ⅓ power boosting partition may be set to a group 1, the 2MLRU may be set to a group 2, the 1MLRU allocation unit of the FFR 1 partition may be set to a group 3, and the 2MLRU may be set to a group 4. FIG. 13 is a view showing a control message alignment pattern if FFR is applied, according to an embodiment of the present invention. As shown in FIG. 13, the generated MLRUs may map resources having the same IE size and the same MCS level to groups composed of logically consecutive MLRUs. At this time, if the resources have the same MCS level and the same IE size but are present in different FPs, resources may be mapped to different groups.

That is, if a plurality of FPs is present due to the FFR as described above, as the example of the grouping method, any one of the above-described grouping methods may be applied within the FP in which control messages are present, and a combination of the above-described grouping methods may be used.

Hereinafter, a method for signaling a method for transmitting an A-A-MAP IE via control channels for performing broadcast to a plurality of UEs will be described. If various FPs are allowed in the system, there is a need for efficiently signaling the FPs. For example, the numbers of the A-A-MAP IE allocation units of each group and the size of each group may be signaled. Alternatively, the number of all possible A-A-MAP IE allocation units of each group may be generated in a table and an index suitable for the transmission method may be signaled. At this time, tables may be generated with respect to the maximum number of MLRUs (e.g., the maximum number of MLRUs is 16, 17, 18, 19, 20, 21, 23, 33, 34, 35, 36, 37, 38, 39, 40, 41, 42) and an index may be selected from a table suitable for the transmission method so as to be transmitted.

Hereinafter, a method for generating a table and signaling an index will be described.

In a first case, a common superset table which is independent of FP construction may be generated and the indexes of the table may be used. For example, even when the number of FPs is 1, 3 or 4, a table to which all the FPs are applicable may be generated. To this end, a superset table including all groups which may be generated when the number of FPs is 1, 3, 4 may be generated. At this time, a superset is determined according to a transmission method. For example, in order to include all the above-described first, second and third examples, a superset table to which a total of four groups are applicable is generated. In addition, in order to include all the above-described first, second and fifth examples, a superset table to which a total of four groups are applicable is generated. In order to include all the above-described first, second and fourth examples, a superset table to which a total of six groups are applicable is generated.

In a second case, a superset table may be generated and indexes related to a specific FP may be signaled as a subset of the superset table. For example, if a superset table, to which a total of four groups are applicable, is present in order to include all the first, second and third examples, the superset table may be used for the first and third examples, and, in the second example, indexes are selectively extracted from the superset table so as to be signaled.

In a third case, tables may be separately generated and used according to FP construction. That is, different tables may be applied according to FPs. For example, in a system in which the number of FPs is 1, 3 or 4, an optimal table suitable for each case is generated and indexes of the table are signaled. At this time, the table generation principle is equal to the above-described method. In the first example, indexes of a table generated using the number of units of each of four groups or a group size may be signaled. In addition, in the second example, indexes of a table generated using the number of units of each of two groups or a group size may be signaled. In addition, in the third to fifth examples, indexes of a table generated using the number of groups or a group size may be signaled.

The number of FPs or the types of tables which should be used may be broadcasted to UEs using a BCH or signaled using a non-user-specific control message within an A-MAP before using indexes.

In a fourth case, a table may be generated by combining groups having the same properties (e.g., the same MCS level and/or IE size) among groups which are present in FPs. For example, in the fourth example or the fifth example, a group 3 and a group 1 have the same properties and a group 4 and a group 2 have the same properties. In this case, the group 1 and the group 3 are combined to form a group A and the group 2 and the group 4 are combined to form a group B, thereby generating a table. In this case, a UE may increase the complexity of blind detection before combining the table in the FPs for decoding the control messages.

Meanwhile, in addition to the criterion for grouping the control messages described up to now, the control messages may be grouped according to the uses of the control messages, e.g., uplink allocation, downlink allocation, or downlink persistent allocation.

Although the grouping criterion is the MCS levels or the sizes of the control messages in the above description, the grouping criterion is not limited to the above examples, and grouping may be performed based on various criteria and the above description is applicable to the various criteria. The method for generating the table supporting various FPs and signaling method may be used in combination with a method for generating a table supporting various bands and a control signaling period. As the method for generating the table, a method for generating a table in consideration of all possible combinations of groups or a method for reducing signaling overhead may be applied.

As described above, it is possible to easily perform blind detection while minimizing overhead, by informing a user of information about a control message alignment pattern in advance before transmitting control messages. Accordingly, it is possible to reduce complexity and time for confirming the control messages.

Figure 14:
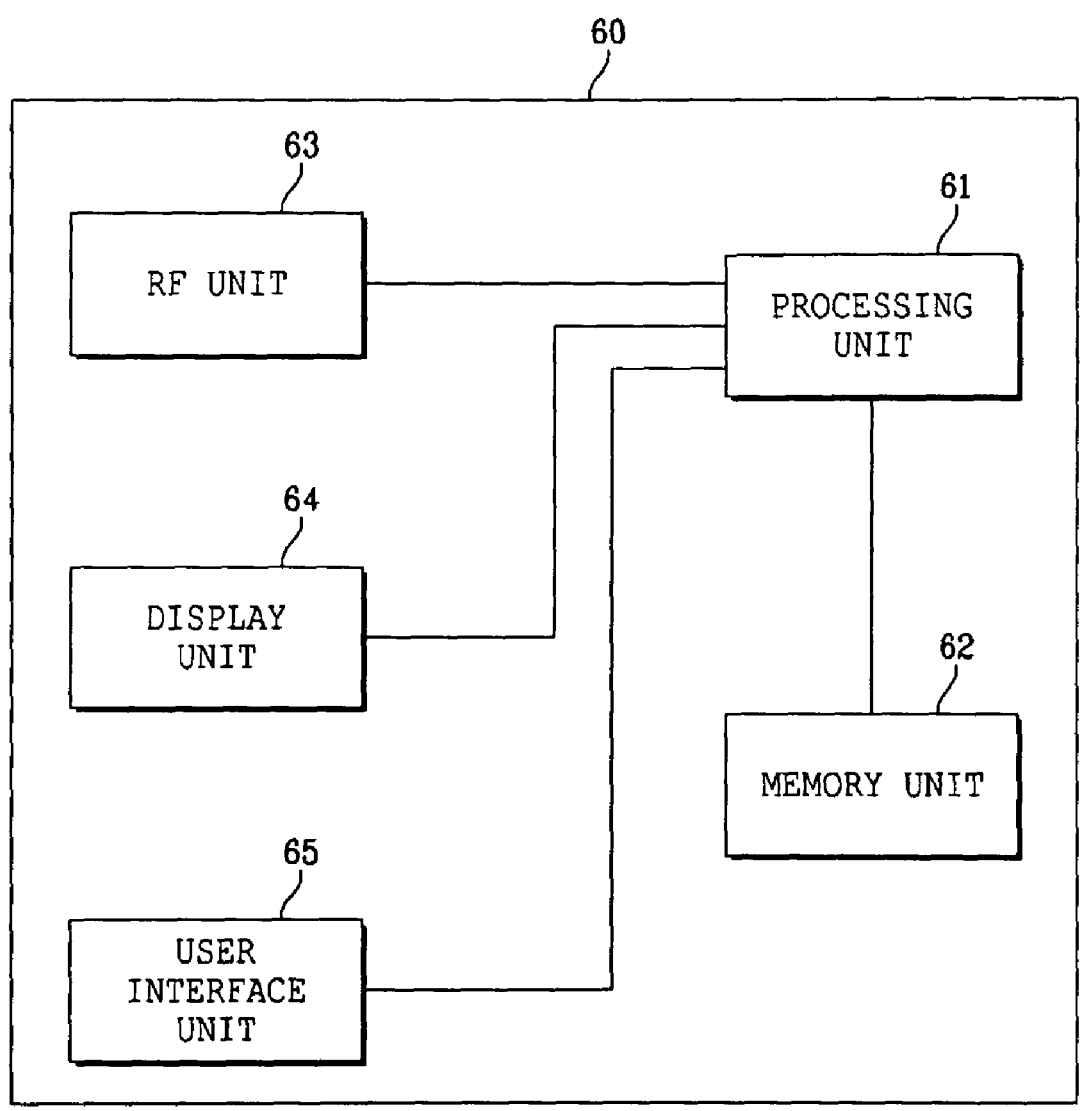
FIG. 14 is a block diagram showing the construction of a device which is applicable to a base station and a User Equipment (UE) and is able to perform the above-described methods.

FIG. 14 is a block diagram showing the construction of a device which is applicable to a base station and a UE and is able to perform the above-described methods. As shown in FIG. 14, the device 60 includes a processing unit 61, a memory unit 62, a Radio Frequency (RF) unit 63, a display unit 64 and a user interface unit 65. A physical interface protocol layer is performed by the processing unit 61. The processing unit 61 provides a control plane and a user plane. The functions of the layers may be performed by the processing unit 61. The memory unit 62 is electrically connected to the processing unit 61 so as to store an operating system, an application program and general files. If the device 60 is a UE, the display unit 64 may display a variety of information and may be implemented using a known Liquid Crystal Display (LCD) or an Organic Light Emitting Diode (OLED). The user interface unit 65 may be configured in combination with a known user interface such as a keypad or a touch screen. The RF unit 63 is electrically connected to the processing unit 61 so as to transmit or receive an RF signal.

The above-mentioned embodiments of the present invention are disclosed on the basis of a data communication relationship between a base station and a UE. In this case, the base station is used as a terminal node of a network via which the base station can directly communicate with the UE. Specific operations to be conducted by the base station in the present invention may also be conducted by an upper node of the base station as necessary.

In other words, it will be obvious to those skilled in the art that various operations for enabling the base station to communicate with the UE in a network composed of several network nodes including the base station will be conducted by the base station or other network nodes other than the base station. The term "Base Station" may be replaced with the term fixed station, Node-B, eNode-B (eNB), or access point as necessary. The term "UE" of the present invention corresponds to a Mobile Station (MS). The term "mobile station" may also be replaced with the term user equipment (UE), Subscriber Station (SS), mobile subscriber station (MSS) or Mobile Terminal as necessary.

In addition, a transmitter refers to a node for transmitting a data or voice service and a receiver refers to a node for receiving a data or voice service. Accordingly, in uplink transmission, a UE may be a transmitter and a base station may be a receiver. Similarly, in downlink transmission, a UE may be a receiver and a base station may be a transmitter.

Meanwhile, as the UE of the present invention, a Personal Digital Assistant (PDA), a cellular phone, a Personal Communication Service (PCS) phone, a Global System for Mobile (GSM) phone, a Wideband CDMA (WCDMA) phone, or a Mobile Broadband System (MBS) phone may be used. For example, the embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be executed by a processor. The memory unit may be located inside or outside of the processor, so that it can communicate with the aforementioned processor via a variety of well-known means.

The present invention is available for a UE or a network apparatus used in a wireless access system.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for transmitting control messages at a base station in a wireless communication system, the method comprising:
    grouping a plurality of control messages for at least one user equipment into one or more control message groups based on at least one criteria of whether or not uplink Acknowledgment/Negative Acknowledgement (ACK/NACK) channel indexes are allowed to be implicitly used in a corresponding control message, whether or not a user equipment the corresponding control message is intended for is able to implicitly use the uplink ACK/NACK channel indexes, a size of the corresponding control message, whether or not the corresponding control message is segmented into a plurality of subblocks, a Modulation and Coding Scheme (MCS) level applied to the corresponding control message, a size of the corresponding control message after applying the MCS level, and a frequency partition in which the corresponding control message is present;
    generating the control message construction information including information about a number of control messages included in each control message group generated by the grouping; and
    transmitting the control message construction information and the plurality of control messages to the at least one user equipment.

2. The method according to claim 1, wherein the information about the number of control messages included in the each control message group is index information selected from a predetermined table.

3. The method according to claim 1, wherein the each control message group contains resource units which are logically contiguous or physically contiguous.

4. The method according to claim 1, wherein the control message construction information is transmitted via a non-user-specific control message.

5. The method according to claim 1, wherein the plurality of control messages are transmitted in a state of being aligned based on the at least one criteria.

* * * * *